Oct. 1, 1968  R. F. JAEKEL ET AL  3,403,511
ENGINE IGNITION SYSTEM
Filed May 16, 1966  2 Sheets-Sheet 1
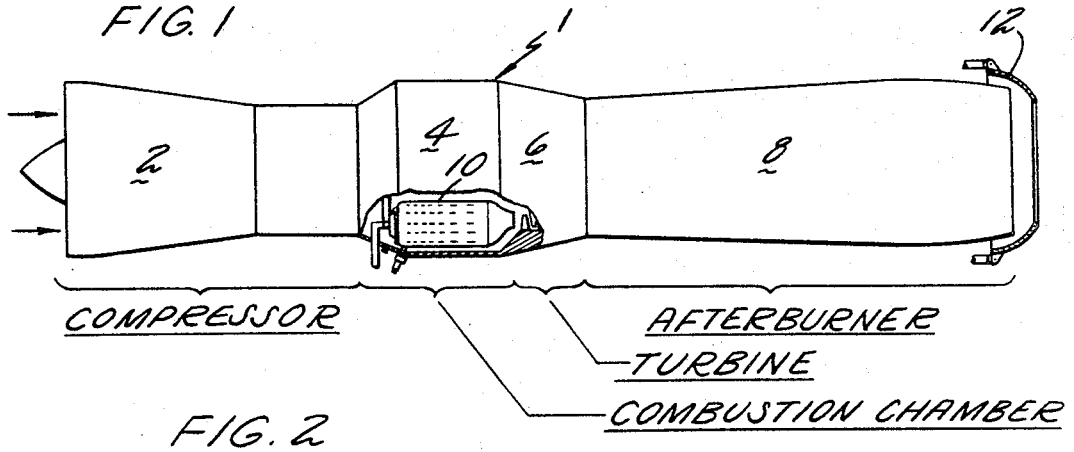
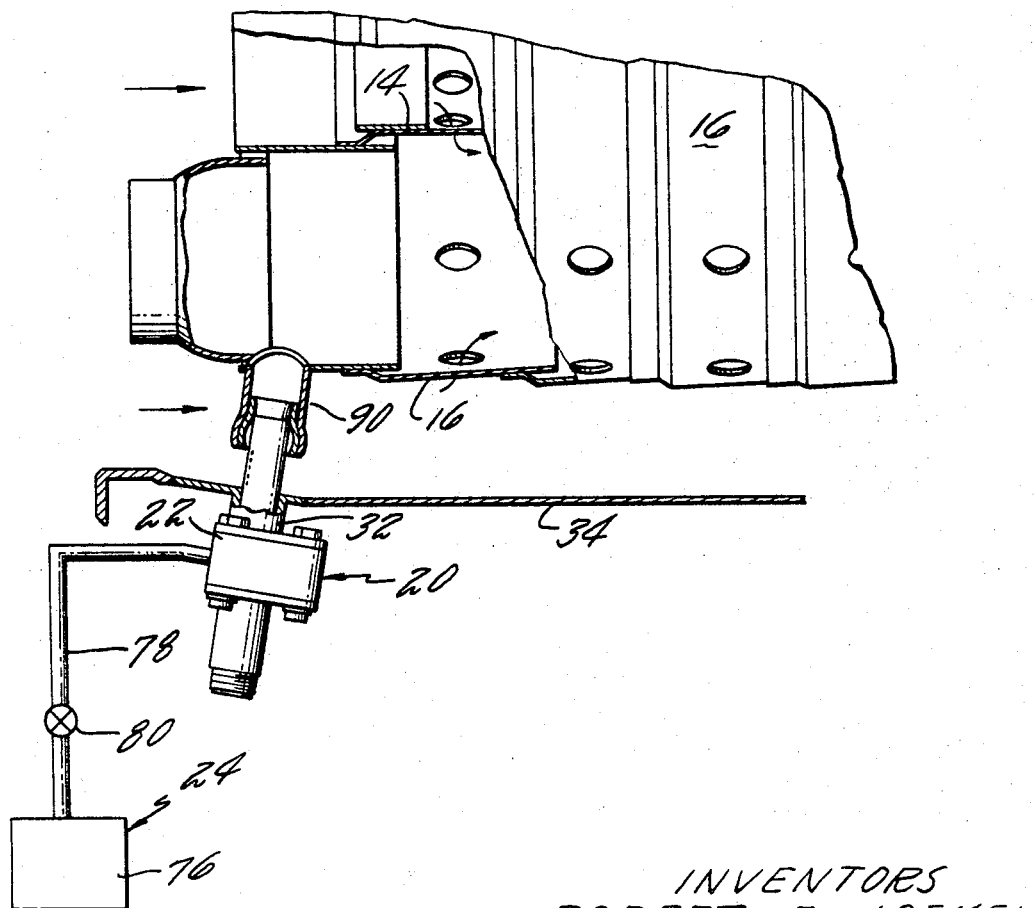
INVENTORS
ROBERT F. JAEKEL
JOHN K. WAYNE
BY Jack N. M. Carthy
AGENT Oct. 1, 1968  R. F. JAEKEL ET AL  3,403,511
ENGINE IGNITION SYSTEM
Filed May 16, 1966  2 Sheets-Sheet 2
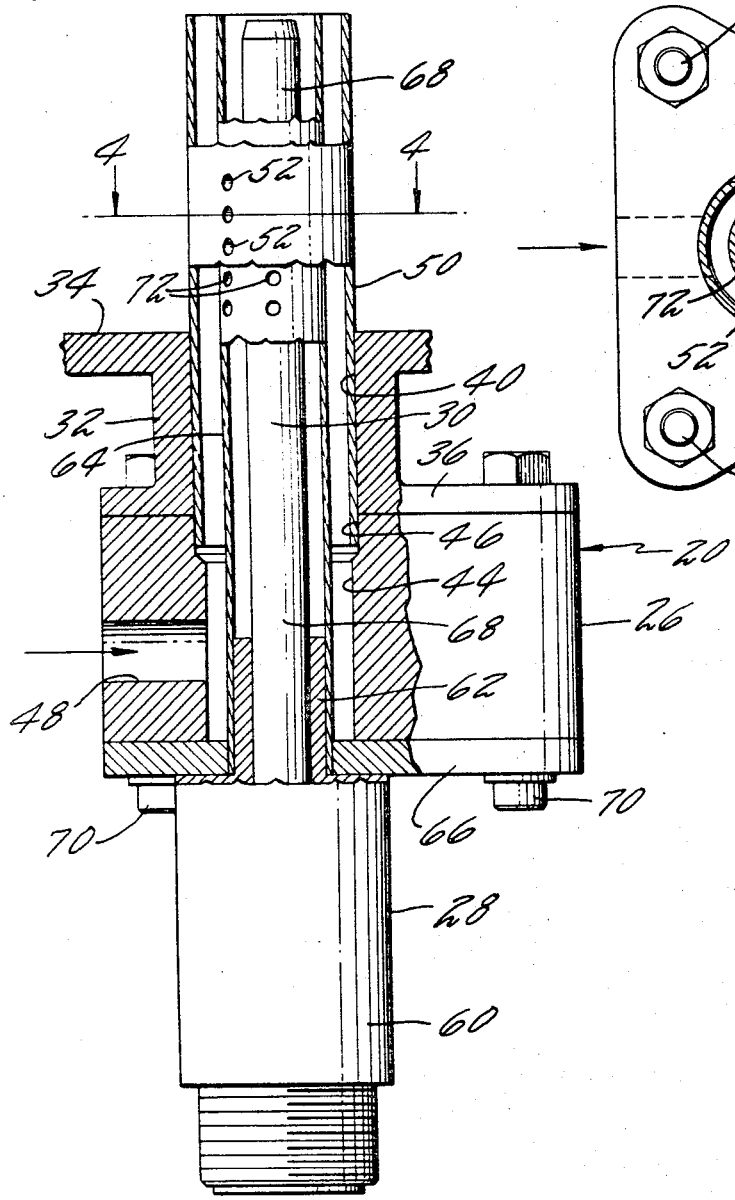
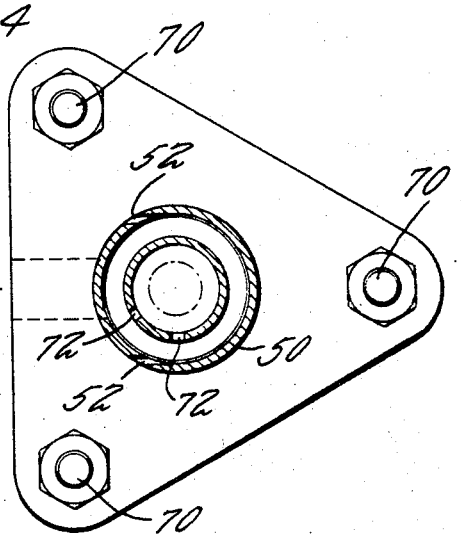

United States Patent Office 3,403,511
Patented Oct. 1, 1968

3,403,511
ENGINE IGNITION SYSTEM
Robert F. Jaekel and John K. Wayne, North Palm Beach, Fla., assignors to United Aircraft Corporation, East Hartford, Conn., a corporation of Delaware
Filed May 16, 1966, Ser. No. 551,192
9 Claims. (Cl. 60—39.82)

ABSTRACT OF THE DISCLOSURE

An ignition system wherein an ignition means extends between an outer casing and a combustion chamber with the ignition means comprising a first outer sleeve having holes positioned so that air flowing between the casing and combustion chamber will flow directly into said holes. Said first sleeve having a second sleeve located therein with said second sleeve having openings positioned so as not to be aligned with any of the holes of the first sleeve. Means are included for injecting ignitible fluid between said first and second sleeves and a glow plug extends through said second sleeve. The free end of said first sleeve adjacent the combustion chamber being positioned in a connector projecting from the combustion chamber. Hydrogen has been used with this ignition means and has proved satisfactory.

---

This invention relates to an ignition system for a turbine engine. A typical gas turbine engine includes one or more combustion chambers through which air is passed and into which fuel is injected or sprayed. In each case, it is necessary that means be provided for igniting a fuel/air mixture.

It is an object of this invention to provide a hydrogen ignition system, which is as near 100% reliable as possible, for use in the main burner as well as the afterburner of a gas turbine engine, especially at open shroud condition.

Another object of this invention is to provide an ignition system using a fluid which provides a large margin of safety for operation.

A further object of this invention is to provide an ignition system which is simple in construction and, therefore, requires less time to service and less cost to operate.

Another object of this invention is to provide an ignition system burning hydrogen which will minimize the amount of residue left on plug injectors.

A further object of this invention is to provide an igniter for a gas turbine combustion chamber which provides for hydrogen being injected between two sleeves which project into a combustion chamber with the inner sleeve containing a glow plug.

Another object of this invention is to provide an igniter having dual sleeves around a glow plug with holes located in each sleeve to permit proper mixing of an igniter fluid and air.

Other objects and advantages will be apparent from the specification and from the accompanying drawings which illustrate the invention.

In the drawings:

FIGURE 1 is a view of a gas turbine engine and afterburner showing the location of an igniter as disclosed in this application with respect to a main combustion chamber.

FIGURE 2 is an enlarged sectional view showing more in detail of the igniter in relation to the combustion chamber and engine casing.

FIGURE 3 is an enlarged view of an igniter showing the dual sleeves and glow plug.

FIGURE 4 is an enlarged view taken along the line 4—4 of FIGURE 3 showing the location of the holes in the outer sleeve and inner sleeve of the igniter.

Referring to FIGURE 1, a gas turbine powerplant is shown indicated generally by 1, the powerplant having a compressor section 2, a combustion section 4, a turbine section 6 and afterburner 8. The combustion section 4 is comprised of a plurality of combustion chambers 10 arranged in a circular manner within the chamber. The afterburner 8 includes a nozzle 12. A powerplant such as shown in FIGURE 1 is disclosed more in detail in U.S. Patent No. 2,980,176. A combustion chamber of the type as shown with this invention is disclosed in U.S. Patent No. 2,951,339 and in U.S. Patent No. 2,813,397.

Each combustion chamber or burner can 10 is constructed having a center tube or central passage 14 within an outer sleeve 16. Fuel is injected into each combustion chamber by fuel nozzles at the forward end of the combustion chamber. The fuel nozzles are located in the annular forward part of the combustion chamber formed by the center tube 14 and outer sleeve 16 with the remainder of the annular forward part being closed off. Swirlers are located around each of the nozzles to aid in mixing the fuel and air. Air is also admitted into the combustion chamber or can through the openings in the center tube 14 and sleeve 16.

To ignite the fuel/air mixture, a hydrogen ignition system 20 is provided. This system 20 includes a main igniter 22 and a control means 24. The igniter comprises a main body 26, a body insert 28, and a glow plug 30. At an intended location for an igniter 20, a boss 32 projects from the outer casing 34 of the combustion section. This boss 32 has an outwardly extending, triangular shaped, flange 36 at the free end thereof for receiving the igniter body 26, and a cylindrical opening 40 extending therethrough from the interior of the casing 34 to the outer face formed on the triangular flange 36.

The main body 26 is formed from a solid member of a triangular shape to match the shape of the flange 36. A cylindrical opening 44 extends through the center of said triangular body with a portion thereof being countersunk at 46. A passageway 48 connects the exterior of one side of the body to the cylindrical opening 44. A sleeve member 50 has one end fixed in the countersunk portion 46. A plurality of holes 52 extend through sleeve member 50. These holes are positioned in two rows extending longitudinally of the member with one edge thereof being tangential to the inner surface of the member 50. The exterior openings of these holes 52 are directed forwardly of the combustion chamber so that air flowing through the engine will flow directly into said opening.

The body insert 28 comprises a connector member 60 having a cylindrical shape with a short cylindrical member 62 extending from one end thereof. A sleeve member 64 has one end which surrounds and snugly engages the member 62 and is fixed thereto. A triangular member 66, having the same triangular shape as the flange 36 and body 26, has an opening at the center thereof which is positioned over the sleeve 64. This member is fixed in this position. The center 68 of a glow plug 30 extends through the interior of the sleeve 62 into the sleeve 64. The glow plug 30 is conventional and contains a coil which is connected to prongs within connector 60. In operation, connector 60 engages a female plug for providing current to heat the glow plug. With the main body 20 in position and the body insert 28 in position, bolts 70 extend through the corners of the matching triangular parts to hold the assembly together. Holes 72 extend radially through sleeve member 64 in a manner so as not to receive an airflow directly from any of the openings 52.

Control means 24 comprises a source of hydrogen 76 and conduit means 78 for connecting said hydrogen to passageway 48. Valve means 80 is positioned in passageway 78 for controlling the flow of hydrogen to the igniter. While the actuation of the valve means 80 can be manual, it can also be actuated by other means at predetermined times to provide a controlled movement. In one instance, the hydrogen was metered into the igniter by means of a control system which was pressurized to 650 p.s.i.g. by gaseous hydrogen. The control system was one which was constructed to meter a predetermined amount of gaseous hydrogen into the igniter at the precise time a desired fuel/air mixture was reached in the burner can.

The free end of the sleeve member 50 extends into a connector 90 projecting from a combustion chamber. The free end of the connector 90 is spherically shaped and has a cooperating open ended member which is movable universally therein.

It is to be understood that the invention is not limited to the specific description above or to specific figures shown, but may be used in other ways without departure from its spirit as defined by the following claims.

We claim:

1. A gas turbine combustion system comprising in combination, a casing, means defining a combustion chamber located within said casing, means for permitting air to enter into the combustion chamber, means for injecting fuel into said combustion chamber thereby forming a combustible fuel/air mixture, an ignition means extending between said casing and the combustion chamber, said ignition means comprising a first sleeve which extends from the side of the casing to a point adjacent the combustion chamber, said combustion chamber having a connector projecting therefrom for receiving the free end of the first sleeve, said first sleeve having a plurality of holes positioned so that air flowing between said casing and combustion chamber will flow directly into said holes, a second sleeve located within said first sleeve, said second sleeve having openings therein positioned so as to not be aligned with any of the holes of the first sleeve, means for injecting an ignitible fluid between said first and second sleeves for flow towards said combustion chamber, and a glow plug extending through said second sleeve for providing the necessary heat.

2. A system as set forth in claim 1 where said ignitable fluid is hydrogen.

3. A system as set forth in claim 1 where the combustion chamber includes a short tubular projection which extends therefrom, and the free end of the first sleeve extends into said tubular projection.

4. A system as set forth in claim 1 whereby said means for injecting an ignitable fluid is located externally of said air duct.

5. A system as set forth in claim 1 wherein said holes are directed forwardly in said air duct.

6. A fuel igniter as set forth in claim 1 where said holes are arranged longitudinally along the first sleeve in a double line with their axes parallel to each other.

7. A fuel igniter as claimed in claim 6 where said openings are arranged longitudinally along the second sleeve in a double line in nonalignment with said holes.

8. A fuel igniter as claimed in claim 6 where said holes enter the interior of the sleeve to inject a fluid tangentially to the sleeve.

9. A fuel igniter as claimed in claim 8 wherein one line of holes are tangential to one side of the sleeve and the other line of holes are tangential to the other side of said sleeve thereby providing mixing.

References Cited

UNITED STATES PATENTS

| 2,648,951 | 8/1953 | McDougal | 60—39.82 |
| 2,672,333 | 3/1954 | Rocheville | 60—39.82 |
| 2,967,224 | 1/1961 | Irwin | 60—39.82 |

FOREIGN PATENTS

| 802,703 | 10/1958 | Great Britain. |
| 875,342 | 8/1961 | Great Britain. |

JULIUS E. WEST, *Primary Examiner.*